United States Patent [19]

Takahashi et al.

[11] Patent Number: 4,730,689
[45] Date of Patent: Mar. 15, 1988

[54] APPARATUS FOR SUPPORTING A SWING FRAME IN A VEHICLE

[75] Inventors: Hirotake Takahashi; Kunio Nanno, both of Saitama, Japan

[73] Assignee: Honda Giken Kogyo Kabushiki Kaisha, Tokyo, Japan

[21] Appl. No.: 728,777

[22] Filed: Apr. 30, 1985

[30] Foreign Application Priority Data

May 1, 1984 [JP] Japan .................................. 59-88126

[51] Int. Cl.$^4$ ............................................. B62D 61/08
[52] U.S. Cl. ..................................... 180/215; 280/724
[58] Field of Search ................ 280/724, 282; 180/215, 180/226, 227, 219

[56] References Cited

U.S. PATENT DOCUMENTS

| | | | |
|---|---|---|---|
| 3,042,424 | 7/1962 | Davis | 280/724 |
| 4,392,536 | 7/1983 | Iwai et al. | 180/217 |
| 4,436,173 | 3/1984 | Takahashi | 180/226 |
| 4,465,300 | 8/1984 | Raidel | 280/725 |
| 4,484,652 | 11/1984 | Shiratsuchi | 180/227 |
| 4,535,869 | 8/1985 | Tsutsumikoshi | 280/282 |
| 4,540,061 | 9/1985 | Watanabe | 180/215 |
| 4,556,119 | 12/1985 | Shiratsuchi | 180/219 |

FOREIGN PATENT DOCUMENTS

| | | | |
|---|---|---|---|
| 13478864 | 11/1962 | France | 280/101 |
| 118326 | 8/1918 | United Kingdom | 280/284 |

*Primary Examiner*—John J. Love
*Assistant Examiner*—Karin L. Ferriter
*Attorney, Agent, or Firm*—Lyon & Lyon

[57] ABSTRACT

Apparatus for supporting a swing frame on a body of a vehicle in which rear wheels are rotatably mounted on the swing frame carried on the rear portion of the vehicle body so that the swing frame is swingable up and down with respect to the body, the rear wheels being driven by a shaft drive transmission mechanism accommodated within the swing frame. The swing frame comprises left and right rear arms disposed in a laterally spaced relation and extending longitudinally of the vehicle body and axle cases connecting the rear arms together and carrying the rear wheels, the left and right rear arms having left and right short pivot shafts, respectively, which are secured to the insides of the front portions of the left and right rear arms, these pivot shafts supporting the swing frame rotatably on the rear portion of the vehicle body for vertical swinging motion around the pivot shafts.

6 Claims, 2 Drawing Figures

APPARATUS FOR SUPPORTING A SWING FRAME IN A VEHICLE

BACKGROUND OF THE INVENTION

1. Field of the Invention

The field of the present invention relates to apparatus for supporting a swing frame on the body of a vehicle in which rear wheels are rotatably mounted on the swing frame carried vertically swingably on the rear portion of the vehicle body, and in which the rear wheels are driven by a shaft drive mechanism accommodated within the swing frame.

2. Description of the Prior Art

Heretofore, a vehicle has been known in which a swing frame is supported on the rear portion of a vehicle body so that the swing frame can be swung up and down, a shaft drive transmission device operatively connected with an engine is accommodated within the swing frame, and rear wheels are driven by the transmission device and are rotatably supported on the swing frame. However, in such a conventional vehicle, it is necessary to place a universal joint, which connects a driving shaft leading to the engine with a propeller shaft, into a position on the axis of a swingable pivot portion of the swing frame in order to allow vertical swinging movement of the swing frame having the shaft drive transmission mechanism. As a result, certain disadvantages arise. The lateral width of the swingable pivot portion of the swing frame is increased. This increases the maximum lateral width of the vehicle more than would otherwise be required and also results in an increase in weight of the vehicle due to the necessity for strengthening the vehicle body in the width direction. These requirements increase cost.

SUMMARY OF THE INVENTION

It is therefore an object of the present invention to provide a simply constructed apparatus for supporting a swing frame in a vehicle, wherein the swing frame is provided with a support portion for swingably supporting the swing frame on the vehicle body, said support portion having such a minimum width and greatly reduced in weight over earlier designs.

In order to achieve the aforementioned object, according to the present invention, a rear swing frame for rotatably mounting rear wheels driven by a shaft drive transmission mechanism accommodated within the swing frame has left and right rear arms disposed in a laterally spaced relation and extending in a longitudinal direction of the vehicle body and axle cases for connecting the rear arms and carrying the rear wheels. The left and right arms may be fixed at insides of front portions thereof with left and right short pivot shafts. The left and right short pivot shafts are disposed on a common axis and inwardly projecting so as to oppose each other. The swing frame may thus be vertically swingably supported on the rear portion of the vehicle body by means of the left and right short pivot shafts.

With the arrangement as described above, the support portion of the swing frame is reduced in lateral width, the pair of pivot shafts for supporting the swing frame may be short and lightweight, and the maximum lateral width of the whole vehicle can be decreased, thus making the support portion of the swing frame lightweight.

These and other features and advantages will be apparent from the following detailed description of a preferred embodiment in reference to the accompanying drawings.

BRIEF DESCRIPTION OF THE DRAWINGS

The drawings show one embodiment of the present invention, wherein.

DESCRIPTION OF THE PREFERRED EMBODIMENT

Figure 1:
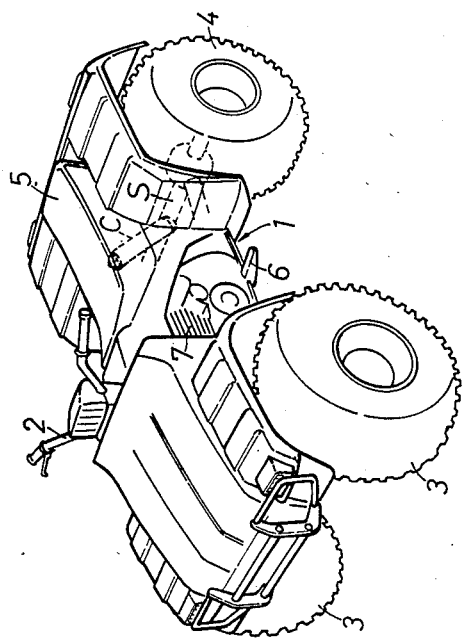
FIG. 1 is a perspective view of a vehicle equipped with an apparatus according to the present invention.

In FIG. 1, a four-wheel vehicle equipped with an apparatus according to the present invention is shown. In the front portion of a vehicle body 1 a pair of left and right front wheels 3, 3 steerable by a steering handle 2 are supported, and in the rear portion of the vehicle body 1 is supported a swing frame S for up and down swinging movement. A rear cushion C is connected between the swing frame S and the vehicle body 1. A pair of left and right rear wheels 4, 4 are supported on the swing frame S.

A seat 5 to be straddled by a rider is provided on the upper surface of the rear portion of the vehicle body 1. At the lower central portion of the vehicle body 1 steps 6 extend outwardly for the rider's feet.

In the central portion of the vehicle body 1 an engine 7, and power from the engine 7 is transmitted to the pair of rear wheels 4, 4 through a shaft drive type power transmission mechanism 8 (FIG. 2) which will be described later.

Figure 2:
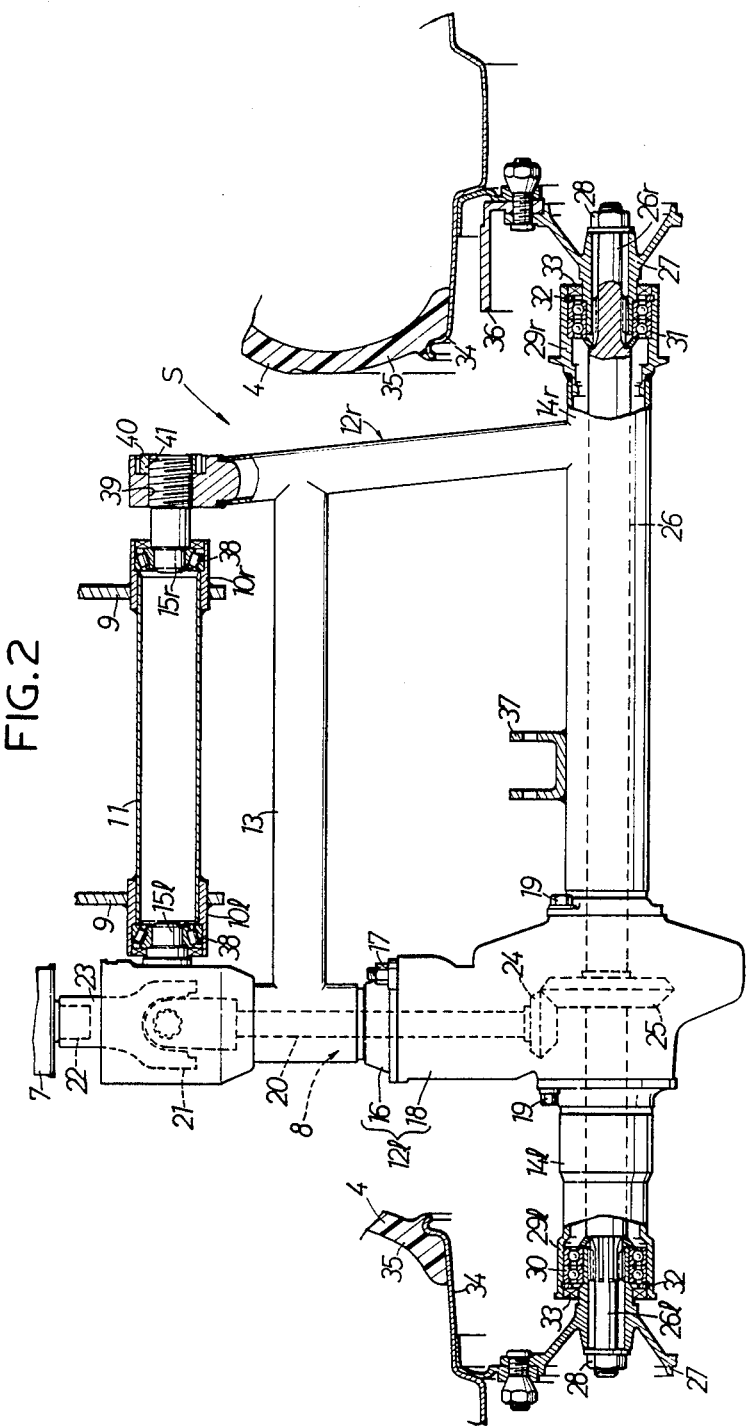
FIG. 2 is a plan view with essential portions sectioned of the apparatus according to the present invention.

Supporting structure for the pair of rear wheels 4, 4 and construction of the driving system will be described in detail with reference to FIG. 2.

In the rear portion of the vehicle body 1, a pair of left and right support frames 9, 9 extend rearwardly substantially parallel to each other. Bearing holders 10$l$, 10$r$ are welded to rear ends of the support frames 9, 9, respectively, and are connected together by a frame pipe 11.

The swing frame S is swingably supported on the pair of left and right bearing holders 10$l$, 10$r$ through taper roller bearings 38, 38 so that the swing frame can be swung up and down.

The aforesaid swing frame S is formed in the form of a square frame by left and right rear arms 12$l$, 12$r$ laterally spaced and rearwardly extended, a cross member 13 to bridge over front portions of the rear arms to connect the latter, a short cylindrical left axle case 14$l$ connected to the rear end of the left rear arm 12$l$ to extend outwardly therefrom, and a long cylindrical right axle case 14$r$ connected to the rear ends of the left and right front arms 12$l$, 12$r$ to extend outwardly.

A short left pivot shaft 15$l$ is integrally connected to the inside of the front portion of the left rear arm 12$l$. A bolt hole 39 is bored in the front portion of the right rear arm 12$r$, and a right pivot shaft 15$r$ in the form of a short bolt is screwed, inwardly from the outside of the right arm 12$r$, into the bolt hole 39. A lock nut 41 is screwed on the outside end of the right pivot shaft 15$r$, the lock nut 41 being received into a recess 40 formed in the right rear arm 12$r$. The left and right pivot shafts 15$l$, 15$r$ are on a horizontal axis perpendicular to the longitudinal direction of the vehicle body 1, and their small diameter portions opposing each other are rotatably supported on the left and right bearing holders, that is, on the vehicle body 1 through taper rolling bearings 38, 38 as previously mentioned.

The left rear arm 12*l* is formed to have a larger diameter than that of the right rear arm 12*r* and also serves as a transmission case for the shaft drive transmission mechanism 8, the left rear arm 12*l* comprising a pipe case 16 having a plurality of pipe members welded together and a gear case 18 secured to the rear end of the pipe case 16 by a bolt and nut 17. Inner ends of the left and right axle cases 14*l*, 14*r* are secured to both left and right sides of the gear case 18 by a plurality of bolts 19. The left rear arm 12*l* serving as the transmission case is internally provided with a propeller shaft 20 which extends longitudinally, and the front end of the propeller shaft 20 is connected via a universal joint 21 to a driving shaft 23 leading to an output shaft 22 of the engine 7. The universal joint 21 is encased within the pipe case 16 of the left rear arm 12*l*, the center of which is on an extension of the axis of the left and right pivot shafts 15*l*, 15*r*. A driving bevel gear 24 is integrally provided at the rear end of the propeller shaft 20. The driving bevel gear 24 is meshed with a driven bevel gear 25 secured to an intermediate portion of the rear axle 26, and the rotational force of the propeller shaft 20 is transmitted to the rear axle 26 through the driving and driven bevel gears 24, 25.

The rear axle 26 longitudinally extends through the left axle case 14*l*, the gear case 18 and the right axle case 14*r*, and has small diameter ends 26*l*, 26*r* at both ends thereof projecting outwardly from the left and right axle cases 14*l*, 14*r*. Hubs 27, 27 of the rear wheels 4, 4 are spline-fitted to respective small diameter ends of axle 26, and nuts 28, 28 are screwed on the axle ends. The pair of left and right rear wheels 4, 4 are thus secured to both ends of the rear axle 26 and driven by rotation of the rear axle 26. Left and right bearing holders 29*l*, 29*r* are integrally provided on the outer ends of the left and right axle cases 14*l*, 14*r*, the left bearing holder 29*l* rotatably supporting the left end of the rear axle 26 as well as the hub 27 of the left rear wheel 4 through a double-row ball bearing 30, the right bearing holder 29*r* rotatably supporting the right end of the rear axle 26 and the hub 27 of the right rear wheel 4 through a double-row ball bearing 31. Circlips 32, 32 for retaining the double-row ball bearings 30, 31 are fixed to the inner peripheral surfaces of the left and right bearing holders 29*l*, 29*r*, and oil seals 33, 33 for sealing lubricating grease for the double-row ball bearings 30, 31 are fitted therein.

The pair of rear wheels 4, 4 are of a well known type wherein a rim 34 is secured to the outer periphery of each hub 27, and a wide balloon tire 35 is mounted on the outer periphery of the rim 34. A brake drum 36 is interposed between the hub 27 and the rim 34 of the right rear wheel 4, and a conventional drum brake system (not shown) is accommodated within the drum 36.

A reference numeral 37 designates a bracket secured to the right axle case 14*r* for mounting the cushion C for suspension of rear wheels.

In the following, operation of the embodiment of the present invention will be described.

Where the swing frame S is assembled into the vehicle body 1, the left pivot shaft 15*l* is rotatably supported on the left bearing holder 10*l* through the taper roller bearing 38, and the right pivot shaft 15*r* screwed into the bolt hole 39 from the outside of the right rear arm 12*r* is rotatably supported on the right bearing holder 10*r* through the taper roller bearing 38. In this case, the left and right taper roller bearings 38, 38 can apply thrust force against the fastening force of the right pivot shaft 15*r* to the left and right pivot shafts 15*l*, 15*r* to increase the support strength of the swing frame S with respect to the vehicle body 1.

When the vehicle runs, power from the engine 7 is transmitted to the rear axle 26 and then to the pair of rear wheels 4, 4 secured to both ends of the axle 26 through the output shaft 22, driving shaft 23, universal joint 21, propeller shaft 20 and driving and driven bevel gears 24, 25. The swing frame S swings up and down around the short left and right pivot shafts 15*l*, 15*r*, and the rear wheels 4, 4 rotate while following the road surface. In this case, the propeller shaft 20 swings up and down around the universal joint 21 together with the swing frame S.

Since load applied to the rear wheels 4, 4, particularly great shock loads due to vertical movement caused by travelling of the vehicle on a rugged or bumpy road surface, are transmitted from the hubs 27, 27 to the left and right axle cases 14*l*, 14*r*, that is, to the swing frame S, through the double-row ball bearings 30, 31 and bearing holders 29*l*, 29*r*, most of the load applied to the rear wheels 4, 4 can be received directly by the swing frame S, and the rotation force transmitted from the engine 7 to the rear wheels 4, 4 acts on the rear axle 26.

While in the above-described embodiment, the present invention has been applied to a four-wheeled vehicle, it should be of course noted that the present invention may also be embodied into two-wheeled and three-wheeled vehicles.

As described above, according to the present invention, the swing frame carried on the rear portion of the vehicle body for up and down swinging motion is composed of the left and right rear arms laterally spaced from each other and extending in a longitudinal direction and the axle cases for connecting between these rear arms and supporting the rear wheels; the short left and right pivot shafts disposed on one and the same axis and projecting inwardly so as to oppose each other are secured to respective insides of the front portions of the left and right rear arms; and the swing frame is supported on the rear portion of the vehicle body by means of these left and right pivot shafts for vertical swinging motion. Therefore, the left and right pivot shafts do not project to left and right outsides from both sides of the swing frame. The maximum lateral width of the vehicle body can be reduced to be as small as possible despite the provision of a universal joint of the shaft drive transmission mechanism on an extention of the axis passing through the pivot shafts, as a consequence of which the widthwise strength of the vehicle body can be held lower than that of prior art to reduce the weight of the entire vehicle, enabling a more compact vehicle to be obtained. In addition, the left and right pivot shafts for swingably supporting the swing frame can be formed with a short length, thereby to further reduce the weight of the vehicle and enhance the assembling ability of the swing frame to the vehicle body.

Moreover, when the left and right pivot shafts as secured to the swing frame are rotatably supported on the vehicle frame through the taper roller bearings as in the above-described embodiment, the thrust force counteracting the fastening force caused by the left and right pivot shafts can be imparted to the pivot shafts by these bearings, which results in increase of the support strength of the swing frame.

Although one embodiment of the present invention has been described, the present invention is not limited to the particular embodiment shown and many modifications and alterations can be made without departing from the scope of the present invention as defined in the appended claims.

What is claimed:

1. In a vehicle having a rear axle and a drive shaft operatively coupled to said rear axle, the combination including:
   a longitudinally extending vehicle frame;
   a frame pipe extending transversely of said vehicle frame and rigidly fixed thereto; and
   a swing frame connected for pivotal movement to said vehicle frame, comprising:
   a rear axle case enclosing said rear axle;
   laterally spaced left and right rear arms extending longitudinally of said vehicle, said rear arms each having one end thereof secured to said rear axle case; and
   coaxially aligned left and right pivot shafts extending laterally inwardly from the other ends of said rear arms, to extend into and be pivotally supported by opposite ends of said frame pipe.

2. The combination according to claim 1 including roller bearings journalling said left and right pivot shafts within said opposite ends of said frame pipe.

3. The combination according to claim 2 in which said drive shaft extends longitudinally through one of said rear arms for connection with said rear axle.

4. The combination according to claim 3 wherein one of said pivot shafts is integrally connected to said one rear arm; and a threaded coupling connecting the other of said pivot shafts to the other of said rear arms.

5. The combination according to claim 4 including a universal joint in said drive shaft and in which said one pivot shaft is connected to said one rear arm adjacent said universal joint.

6. The combination according to claim 1 including a rear cushion fixed at one end to an axially central position of said rear axle case and at the other end to said vehicle frame.

* * * * *